(12) United States Patent
Meier

(10) Patent No.: US 7,251,232 B1
(45) Date of Patent: Jul. 31, 2007

(54) POINT-CONTROLLED CONTENTION ARBITRATION IN MULTIPLE ACCESS WIRELESS LANS

(75) Inventor: Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 1003 days.

(21) Appl. No.: 09/953,820

(22) Filed: Sep. 12, 2001

Related U.S. Application Data

(60) Provisional application No. 60/252,717, filed on Nov. 22, 2000.

(51) Int. Cl.
*H04Q 7/24* (2006.01)

(52) U.S. Cl. ............... 370/338; 370/352; 370/348; 370/468

(58) Field of Classification Search ......... 370/338, 370/352, 331, 337, 348, 465, 468, 355
See application file for complete search history.

(56) References Cited

U.S. PATENT DOCUMENTS

| | | | |
|---|---|---|---|
| 4,872,163 A * | 10/1989 | Follett et al. ......... | 370/462 |
| 5,276,680 A | 1/1994 | Messenger | |
| 5,329,531 A * | 7/1994 | Diepstraten et al. ... | 370/347 |
| 5,621,732 A | 4/1997 | Osawa | |
| 5,673,031 A | 9/1997 | Meier | |
| 5,737,328 A | 4/1998 | Norman et al. | |
| 5,862,142 A * | 1/1999 | Takiyasu et al. ...... | 370/480 |
| 5,903,373 A * | 5/1999 | Welch et al. .......... | 398/128 |
| 5,940,771 A * | 8/1999 | Gollnick et al. ....... | 455/517 |
| 6,002,918 A | 12/1999 | Heiman et al. | |
| 6,049,533 A | 4/2000 | Norman et al. | |
| 6,067,297 A | 5/2000 | Beach | |
| 6,275,518 B1 * | 8/2001 | Takahashi et al. ...... | 375/135 |
| 6,430,172 B1 * | 8/2002 | Usui et al. ............. | 370/347 |
| 6,529,520 B1 * | 3/2003 | Lee et al. .............. | 370/442 |
| 6,587,453 B1 * | 7/2003 | Romans et al. ......... | 370/347 |
| 6,704,932 B1 * | 3/2004 | Matsunaga et al. ..... | 725/126 |
| 6,747,968 B1 * | 6/2004 | Seppala et al. ......... | 370/338 |
| 6,791,996 B1 * | 9/2004 | Watanabe et al. ...... | 370/447 |
| 6,804,222 B1 * | 10/2004 | Lin et al. .............. | 370/338 |
| 6,813,260 B1 * | 11/2004 | Fogle .................... | 370/338 |

(Continued)

OTHER PUBLICATIONS

XP-002307525, "IEEE Standard for Local and Metropolitan area networks—Port-Based Network Access Control", LAN/MAN Standards Committee of the IEEE Computer Society, pp. 13-21.

(Continued)

*Primary Examiner*—Wing Chan
*Assistant Examiner*—Andrew C. Lee
(74) *Attorney, Agent, or Firm*—Tucker Ellis & West LLP

(57) ABSTRACT

A method providing quality of service during a contention period. A tiered access protocol enables an Access Point to act as a channel arbitrator and gain control a channel during a contention period. The Enhanced Access Point waits a specified amount of time after before taking control of a channel for either transmitting an outbound frame or initiating Polled-Contention Free Bursts. In addition, a method for increasing the time span between Delivery Traffic Indication Message beacons by tracking when Wireless Stations are able to receive messages and instantly delivering messages to those Wireless Stations.

16 Claims, 2 Drawing Sheets

U.S. PATENT DOCUMENTS

| | | | |
|---|---|---|---|
| 6,842,605 B1 * | 1/2005 | Lappetelainen et al. | 455/13.4 |
| 6,865,609 B1 * | 3/2005 | Gubbi et al. | 709/230 |
| 6,907,044 B1 * | 6/2005 | Yonge et al. | 370/445 |
| 6,914,890 B1 * | 7/2005 | Tobita et al. | 370/338 |
| 6,934,753 B2 * | 8/2005 | Kim | 709/225 |
| 6,950,397 B1 * | 9/2005 | Ho et al. | 370/235 |
| 6,970,422 B1 * | 11/2005 | Ho et al. | 370/230 |
| 6,990,116 B1 * | 1/2006 | Young et al. | 370/445 |
| 7,031,287 B1 * | 4/2006 | Ho et al. | 370/338 |
| 7,050,459 B2 * | 5/2006 | Kandala | 370/469 |
| 2002/0071448 A1 * | 6/2002 | Cervello et al. | 370/445 |
| 2003/0165140 A1 | 9/2003 | Tang et al. | |

OTHER PUBLICATIONS

Bernard Aboba, et al., XP-002307526, "IEEE 802.1X For Wireless LANs", Mar. 2000, Slides 1-27.

Maarten Hoeben; "No Wires Needed"; May 10, 2000; IEEE P802.11.

Mathilde Benveniste; "Tiererd Contention"; Nov. 2000; IEEE P802.11.

Menzo Wentink; "Probabilistic DCF Versus Backoff DCF"; Nov. 2000; IEEE P802.11.

* cited by examiner

POINT-CONTROLLED CONTENTION ARBITRATION IN MULTIPLE ACCESS WIRELESS LANS

CROSS-REFERENCE TO RELATED APPLICATIONS

This application claims the benefit of U.S. Provisional Application No. 60/252,717 filed Nov. 22, 2000.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention is directed to channel access methods that provide Quality of Service ("QoS") for shared communications, more specifically to channel access methods that provide Quality of Service on IEEE 802.11 wireless networks.

2. Description of the Related Art Including Information Disclosed Under 37 CFR 1.97 and 37 CFR 1.98

The abbreviations and acronyms used in this application are well known to those skilled in the art and can be readily located in the IEEE 802.11 standard, or in the IEEE 802.11E QoS baseline proposal. See Michael Fischer, QoS Baseline Proposal, IEEE 802.11 Standards Committee, Document IEEE 802.11-00/360 (Nov. 7, 2000); also QoS Baseline Proposal Revision 1, Document IEEE 802.11-00/360R1 (Nov. 7, 2000) and QoS Baseline Proposal Revision 2, Document IEEE 802.11-00/360R2 (Nov. 9, 2000), the contents of which are hereby incorporated by reference. Some of the abbreviations and acronyms used in this application are:

| | |
|---|---|
| ACK | Acknowledgement; |
| AP | Access Point; |
| BSS | Basic Service Set; |
| BSSID | Basic Service Set Identification; |
| CCA | Clear Channel Assessment; |
| CFP | Contention-Free Period; |
| CF-Pollable | Contention-free Pollable |
| CP | Contention Period; |
| CW | Contention Window; |
| DCF | Distributed Coordination Function; |
| DIFS | Distributed (coordination function) Interframe Space; |
| CW | Contention Window; |
| DTIM | Delivery Traffic Indication Message; |
| EAP | Enhanced Access Point; |
| IFS | Interframe Space; |
| MAC | Medium Access Control |
| NAV | Network Allocation Vector; |
| PCF | Point Coordination Function; |
| P-CFB | Point-controlled Contention-free Bursts; |
| PIFS | Point (coordination function) Interframe Space; |
| QoS | Quality of Service; |
| SBM | Subnet Bandwidth Manager; |
| SIFS | Short Interframe Space; |
| STA | Station; |
| V-DCF | Virtual Distributed Coordination Function; |
| WSTA | Wireless (enhanced) Station. |

In the description that follows, an "outbound" transmission is a transmission from an AP and an "inbound" transmission is directed to an AP. FIG. 2 illustrates the relationship between a SIFS, PIFS and DIFS as used herein and as defined in the 802.11 specification. As can be observed from FIG. 2, a SIFS is always a shorter interval than a PIFS, and a PIFS is always a shorter interval than a DIFS.

The IEEE 802.11E QoS working group has adopted a baseline proposal (hereinafter "baseline proposal") for channel access methods that provide QoS on 802.11 wireless LANs. The baseline proposal defines three QoS levels—a "prioritised" DCF-based solution and "prioritised" and "parameterised" PCF-based solutions. It is generally agreed that a single unified approach is better from a user perspective; however, no single approach, as it is currently defined, is applicable to all environments. A PCF approach is more deterministic and efficient in single-BSS environments; however, it is difficult to implement a CFP scheduling algorithm in environments with BSS overlap. The present invention is directed to an integrated DCF/PCF channel access model that uses V-DCF for lightly and moderately loaded channels, and dynamically uses unscheduled "Point-controlled Contention-free Bursts", to arbitrate channel contention, as the network load increases.

The baseline "prioritised" solutions are intended for stations that simply send and receive prioritised frames. The baseline "parameterised" solution is intended for WSTAs that use a signaling protocol to establish bandwidth requirements and delay constraints. This invention, the Point-controlled Contention Arbitration model, or PCCA model, requires all WSTAs to implement sufficient channel access and interface functions to support optional parameterised services. QoS features can be added to an AP implementation on an incremental basis.

The baseline proposal discloses a virtual DCF protocol ("V-DCF). By design, the V-DCF, or level 1 in the baseline proposal, cannot provide integrated services such as "Controlled Load" and "Guaranteed Bandwidth". Two fundamental requirements are lacking for controlled load service. 1) The total traffic at a given QoS priority must be limited (i.e. by admission control), and 2) higher priority traffic cannot be affected by lower priority traffic. The V-DCF level cannot support admission control because it lacks even a simple signaling protocol. The V-DCF access method, with contention offset and CWmin values per category, only statistically increases the probability of channel access for higher-priority packets. A tiered channel access method can be used to isolate a high-priority traffic category but only if the idle sense time, required for any lower-priority traffic category, is greater than the sum of the idle sense time plus the maximum CW value for the high-priority category. However, the tiered method doesn't scale well for large high-priority populations. "Guaranteed Bandwidth" service has the same requirements as controlled load and also requires a deterministic channel access method.

Presently, 802.11 networks use two protocols, the DCF and PCF. The DCF works great under low load situations. The PCF works optimal under high load conditions. The DCF works better in networks where BSSs overlap, the PCF is ideally suited for networks where BSSs are carefully planned not to overlap. The DCF has a relatively low implementation complexity, the PCF is reputed to be more complex to implement. The DCF does not allow explicit access control, the PCF does. The DCF efficiency drops considerably in densely populated BSSs, the PCF has no scaling problem.

Due to the inability of the PCF to work well under overlapping BSS conditions and the high implementation complexity, the PCF has not yet been widely adopted in current 802.11 implementations. The demand for better medium efficiency and a versatile QoS platform, however, increased interest in this optional access mechanism of the 802.11 MAC.

The hybrid nature of the 802.11 MAC has caused proposals to focus either on the DCF or the PCF. However, by only looking at the PCF and not considering the DCF overlooks the fact that the 802.11 MAC always spends some time under the DCF access mechanism rules and that the DCF is also an integral part of a PCF based system. The system always has to spend at least a small part of its time under the DCF. The PCF has the fundamental characteristic that a station can't access the medium unless explicitly polled. However, to be polled, the station must first make itself known to the Point Coordinator, which requires medium access. Therefore, a PCF based solution must support both contention-free and contention periods. A contention period is required for bursty traffic, adjacent BSSes, probe requests, association and re-association requests, etc.

FIG. 1 shows an example of a sample rate for a real-time application in a WSTA and the associated polling sequences for that WSTA. The lower portion 12 of FIG. 1 shows the WSTA sample rate. The upper graph 14 shows the polling sequences. The polling sequence starts with a DTIM beacon 16. The contention-free period 18 starts immediately after the DTIM beacon 16. During the contention-free period 18, the point controller initiates polling sequences 20. After the polling sequences 20 is shown an idle time period 22. The idle time period 22 is then followed by an additional polling sequences 20 and idle time periods 22. Following the contention-free period 18 is the contention period 24. After the contention period 24, another DTIM beacon 16 starts a new sequence of a contention-free period 18 and a contention period 24.

In FIG. 1, the DTIM beacon rate is slower than the sampling rate. Idle time 22 is introduced if the CFP is extended so that the same WSTA can be polled more than once per CFP. Latency is introduced if the channel is overloaded in the contention period.

Delay sensitive applications, such as VoIP, require short DTIM intervals (i.e. 30 milliseconds) to minimize CF polling latency. A fast DTIM beacon rate wastes bandwidth because of the beaconing overhead and because contention-based transmissions cannot span the TBTT (per the baseline proposal). A fast DTIM beacon rate also requires power-save WSTAs to wake up more often, for example to receive multicast frames and buffered unicast frames.

In installations with multiple QoS applications with different service rates, the DTIM beacon rate cannot match the sampling rate for each application. Actually, it is difficult to match the sampling rate for any application. It is not efficient to arbitrarily poll WSTAs in every CFP. Therefore, some sort of signaling protocol is necessary to suppress unnecessary polls. In addition, a need exists for a protocol that can divorce the service rate, for active parameterised stations from the beacon rate. Periodic polling is not optimal for intermittent traffic. VoIP traffic can be intermittent due to silence suppression.

Depending on the 'load of the medium', the system may spend more or less time in the CFP. In a heavily loaded system, the system may spend the larger part in the CFP while a mildly loaded system may spend the larger part in the CP. The balance between the two access mechanisms is a function of the medium load. As a consequence, both access mechanisms must provide the same QoS capabilities. The transition between one access mechanism and the other must be a smooth one. This is especially a challenge in average loaded systems where the DCF efficiency is starting to breakdown while the PCF efficiency is not yet optimal. For the upper layer protocol (or application) the performance profile of the service should be linear over all medium conditions and this is something that should be considered when proposing a PCF based system. Therefore, when proposing PCF enhancements, one also to consider the interaction between the PCF and the DCF and the dynamics of the system as a whole under various medium load conditions.

PCF combines the ability of full medium control with optimal medium efficiency, without suffering from scalability problems. However, there are two issues that limit the use of the current PCF for QoS systems. Section 9.3.4 and specifically clause 9.3.4.1 of the IEEE 802.11 standard imposes strict rules upon the order in which stations are addressed or polled. This is undesirable in a QoS system. Secondly, there is no mechanism, other than the More-Data bit, that allows a station to communicate its queue states to the PC.

The entity in the PC that actually calculates the order in which stations are addressed is in literature often referred to as the 'scheduler'. The rules for the handling of the polling list limit the freedom of the scheduler and may conflict with QoS requirements. The original intent to poll stations in order of ascending AID value is not clear from the standard and in fact the whole concept of a polling list may become obsolete due to the introduction of a mechanism for communicating To-DS queue state(s). Therefore, the rules as defined in section 9.3.4 are neglected for this method.

In order to make accurate scheduling decisions, the scheduler in the PC needs to have knowledge about the queues in the associated stations. The More-Data bit is a Boolean that could be used for this but only allows communication of a truth-value on the queue state; for a good scheduler implementation this is not enough. Preferably, the scheduler needs to know the length and priority of the next frame in the queue of each station.

Scheduling problems arise with CFPs in networks with overlapping BSSes in the same ESS or multiple ESSes. A CFP is not completely contention-free unless all stations in any neighboring BSS, that are in range of any active stations in the BSS, set their NAV for CFPMaxDuration for the CFP. Therefore, the total "reservation area" for a CFP can be very large compared to the coverage area of the point controller for the BSS.

The baseline proposal defines a "proxy beacon" mechanism where WSTAs in a BSS repeat AP beacons to extend the area for propagating beacon information to hidden nodes. The baseline proposal does not define which WSTAs should send proxy beacons and it does not define the scheduling mechanism for proxy beacons. Also, it is not clear whether a hidden node in a neighboring BSS, that receives proxy CFP beacons, should set its NAV for CFP-MaxDuration for the TBTT of the associated hidden CFP. If hidden nodes do not set their NAV for proxy beacons, then CFPs are not contention-free.

If hidden nodes set their NAV for CFPMaxDuration for a hidden CFP (due to proxy beacons or some other mechanism) then two difficult problems must be considered. First, as noted above, spatial reuse is severely inhibited as compared to DCF. The baseline proposal attempts to solve the "spatial reuse" problem by classifying WSTAs as belonging to overlap and non-overlap sets per BSS. However, that approach does not work for all applications because it assumes that a WSTA is relatively stable compared to its transmission rate and it uses the flow error rate as an overlap indicator. Second, if a hidden CFP ends early, then bandwidth is wasted because hidden nodes may not be able to determine that the hidden CFP has ended. It has been suggested that WSTAs that transmit proxy beacons could also transmit "proxy CF-End" messages or CF-End messages could be transmitted on the distribution system. The first solution is "chatty" and the second solution is not generally applicable because the distribution system may introduce latency (i.e. if it includes wireless links or IP tunnel links).

It should also be noted that in the PCF/CFP model, where the NAV is set for long CFPs, use of sophisticated techniques that increase spatial reuse by varying the transmit power and/or antenna direction per unicast transmission sequence is inhibited.

One suggested PCF enhancement that can ease the overlapping BSS problem and alleviate the scheduling problem is the Contention Free Burst. A paper entitled "Suggested 802.11 PCF Enhancements and Contention Free Bursts", IEEE 802.11-00/113 (May 10, 2000), written by Maarten Hoeben and Menzo Wentink, hereby incorporated by reference, describes bi-directional contention-free bursts that include point controller polling.

The Contention Free Bursts concept breaks up a Contention Free Period into smaller Contention Free Bursts. This is useful for two reasons: First, it allows the PC to relinquish medium control to other BSSs in the same area. Second, in the case of average loaded systems, the PC can temporarily give-up medium control (to possibly another BSS) and defer control until new frames are available for transmission.

Normally, a CFP starts with the transmission of a Beacon. A SIFS after the Beacon, the first CFB is started. Within the CFB, the PCF transfer procedures apply as defined in section 9.3.3 of the IEEE 802.11 standard. CFBs have a maximum duration of CFBMaxDuration. The duration remaining in the CFB is encoded in the Duration/ID field of every From-DS frame sent by the PC. The CFB may be foreshortened but never lasts longer than CFBMaxDuration. The end of a CFB is signaled through a duration of 0.

Between two CFBs the PC performs a random backoff, selected from a range of 0 to CW-1 slots. The random backoff mechanism allows PCs to contend for the medium to start a new CFB. In the current definition of the CFP, all stations (including other access points) set their NAV based on the Duration Remaining field in the CF-Parameter set and reset the NAV upon receiving a CF-End. This prevents access points and stations from accessing the medium during observed medium idleness during the CFP (possibly caused by the transmission of a frame by a hidden node). PCs may use the backoff mechanism to contend for the medium and start a CFP or continue their own CFP with a new CFB. In a sense the CFB concept works like a superimposed DCF over the PCF. PCs coordinate their bursts by using the backoff-mechanism, deferring and restarting the backoffs whenever a PC starts a CFB or ends the CFB. The CFBs are protected through the NAV-alike duration field in the redefined in Duration/ID field, CPs use the information as received in the ToDS frames from other CPs to update their CF-Nav and defer backoff and start of a new CFB.

Note that only PCs contend for medium control; stations (and legacy access points) do not attempt to access the medium during the periods of medium silence caused by the backoff periods because they adhere to the Contention Free Periods of (at least one of) the BSSs. A CFB is furthermore protected from interference of legacy implementations due to the SIFS/PIFS interframe spaces, and a Duration/ID field that is interpreted as a very long NAV.

Another concern is that PCF and DCF applications do not always coexist well. The PCF model only supports "polled" inbound transmissions during a CFP. As a result long PCF-based CFPs can starve DCF-based stations. The problem is exacerbated when CFPs in overlapping BSSes must be scheduled to avoid CFP contention. PCF polling is appropriate for isochronous applications, but DCF is more appropriate for asynchronous data. It should not be assumed that PCF polling is used for all high-priority inbound transmissions; however, the current baseline model inherently prioritizes PCF over DCF. As an example, consider inbound asynchronous high-priority network control transmissions. Such transmissions can be delayed extensively by lower priority PCF transmissions.

The current 802.11 standard specifies that an AP must buffer all outbound multicast frames and deliver them immediately following a DTIM beacon if "strict ordering" is not enabled, then. Therefore, short DTIM intervals are necessary to support multicast applications that cannot tolerate delays. In addition, outbound multicast transmissions are more susceptible to problems associated with inter-BSS contention and hidden nodes because multicast frames are not retransmitted (i.e. after a collision with a hidden node) and the DCF channel reservation mechanisms cannot be used for multicast frames.

The baseline proposal removes the restriction that buffered multicast/broadcast frames must be sent immediately following a DTIM beacon. The baseline proposal requires that QoS WSTAs must respond to +CF-Polls. Therefore, it is strongly recommended that QoS stations should also associate as CF-Pollable (i.e. not requesting to be polled). If QoS power-save WSTAs do not use the PS-Poll mechanism for the delivery of outbound buffered messages, an AP can more easily schedule outbound transmissions for PS WSTAs. Note that CF-Pollable stations do not send PS-Poll frames to solicit outbound transmissions. Instead, a CF-Pollable station must stay awake, after it receives a DTIM beacon with its AID bit set on, until either it receives a unicast frame with the more bit set off, or a TIM with its AID bit set off. Therefore, it is generally assumed, but not required, that QoS WSTAs with active flows will operate in active mode because a point controller cannot successfully poll a WSTA that is in power-save mode.

The baseline proposal defines "awake-time epochs" that can, optionally, be used to set an awake-time window for periodic polling and/or outbound data transmissions. However, awake-time epochs introduce complexity for P-CFB polling and PCF polling. If power management must be supported, it would be simpler to schedule P-CFB polls for power-save parameterised WSTAs, if such WSTAs used automatic power-save intervals. Such a power-save WSTA can remain in power-save mode for, at most, the duration of its "automatic power-save interval", following an inbound transmission, where the duration is selected to match the WSTAs inbound transmission rate. The point controller can simply adjust the duration of the poll timer, for a WSTA, so that it is greater than the sleep-time window duration. The point controller can then poll a WSTA and/or deliver outbound buffered data for a WSTA when the poll timer expires.

Therefore, for the reasons set forth above, there is a need for a contention-based channel access method for supporting parameterised QoS applications. Furthermore, the channel access method must coexist well with PCF and DCF applications.

BRIEF SUMMARY OF THE INVENTION

In view of the aforementioned needs, the invention contemplates a contention-based channel access method where the channel access population is divided into two distinct groups; the first group is a set of channel access arbitrators, and the second group is the set of all other stations. Channel access is highly prioritized for the channel arbitrators so that an arbitrator can quickly gain control of a (i.e. heavily loaded) channel during a contention period and mitigate contention by directing (i.e. polling) which stations can access the channel.

The arbitrator, normally an Enhanced Access Point, monitors the service rate of a station within its basic service set. The service rate may either be for outbound transmissions from the arbitrator to the station or for inbound transmissions from the station to the arbitrator. Typically, the arbitrator uses a poll timer to track when a station needs to be serviced. After every communication with the station the poll timer is reset. During light or medium loaded conditions, the workstation should be able to communicate before the poll timer expires, thus obviating the need for the arbitrator to take control of the channel.

The arbitrator gains control of the channel by sensing the channel being clear for a shorter time frame than that required for all other stations within the basic service set. In the preferred embodiment, the arbitrator waits a maximum of a distributed interframe space before reserving the channel. However, the arbitrator may gain control of the channel during the contention period after the channel is idle for a short interframe space following an inbound transmission from a station to the arbitrator or a station to station transmission that originates from a station within the basic service set.

Once the arbitrator gains control of the channel, it may send multicast transmissions to a plurality of stations, send a unicast transmission to a station, or poll stations with time bounded applications and receive inbound transmissions from those stations. In the preferred embodiment, all the transmissions are contention free bursts that include one or more data frame transmissions.

The method of the present invention requires minimal changes to the 802.11E baseline proposal for QoS. The method can be combined with the mechanisms and concepts, proposed by the 802.11E QoS working group, into a unified implementation framework that is consistent with the baseline proposal. The significant protocol changes are: (1) a tiered channel access mechanism provides deterministic channel access for EAPs in the contention period; and, (2) EAPs can use PCF-like polling to arbitrate contention during the contention period. The 802.11E baseline QoS proposal already includes facilities for unidirectional "contention-free bursts" and requires QoS WSTAs to be CF-Pollable.

Another embodiment of this invention contemplates a multicast power-management enhancement that can be used to reduce the DTIM beacon rate. In 802.11 networks, access points buffer multicast frames and transmit those frames immediately following DTIM beacons, so that "power-save" stations can "sleep" between DTIM beacons without missing multicast transmissions. Some time-bounded applications require a rapid DTIM beacon rate to avoid latency. As a result stations must wake up more often and bandwidth is wasted because stations are prohibited from transmitting before a DTIM beacon.

Presently, outbound multicast transmissions are made only immediately after a Delivery Traffic Indication Message beacon. The access point must buffer outbound multicast frames between DTIM beacons. Because the arbitrator is monitoring station service rates, the arbitrator knows when those stations being monitored are active on the channel and available to receive data from the arbitrator. Thus, the arbitrator may send outbound messages independent of any beacons. By associating the active stations to multicast groups, it may determined when all of the stations in the multicast group are available to receive frames. Therefore, an arbitrator can wait until all of the stations of a multicast group are active and broadcast a multicast frame independent of the DTIM beacon. Because the arbitrator has the capability to gain control of a channel during the contention period, multicast frames for time bounded applications may be transmitted during the contention period, thus obviating the need for more frequent DTIM beacons. In the preferred embodiment, the arbitrator would request that all stations must operate in active mode to join an "active multicast group."

While the multicast transmission method can be utilized to increase power savings, it is also contemplated that this method can be used anytime a group of stations running a time bounded application needs to receive a multicast frame. Divorcing the broadcast of multicast frames from the DTIM beacon, especially for parameterised QoS wireless stations requiring frequent servicing, can result in a reduction of the DTIM beacon rate. Reducing the DTIM beacon rate has the additional benefit of easing channel congestion.

As with the power savings method, the access point buffers a multicast frame for a multicast group, associates the individual stations with their appropriate multicast groups, waits until every station of a multicast group is in an active mode, and broadcasting the frame.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF INVENTION

Figure 1:
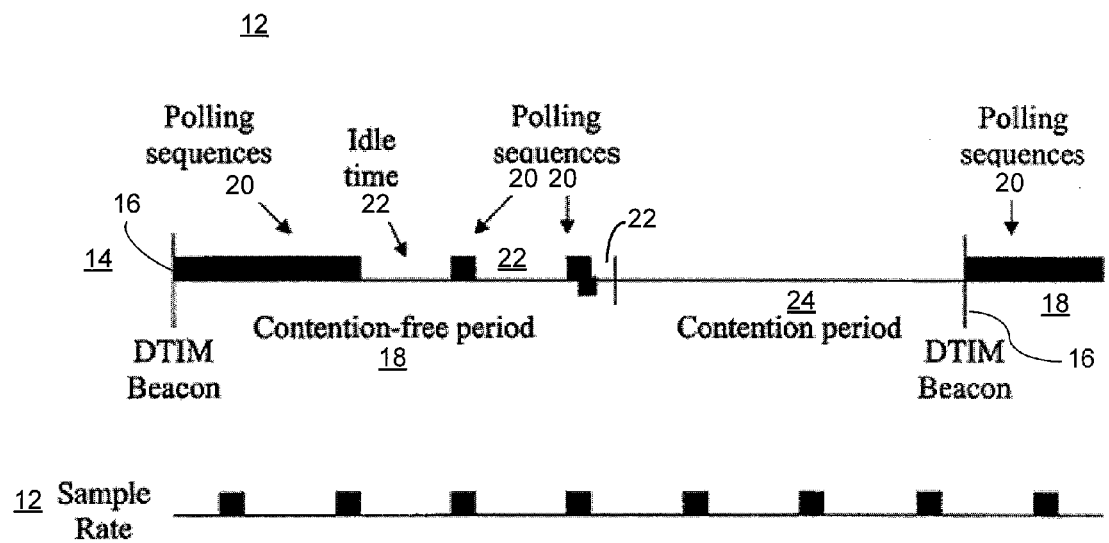
FIG. 1 shows an example of a sample rate for a real-time application in a WSTA and the associated polling sequence for that WSTA.
Figure 2:
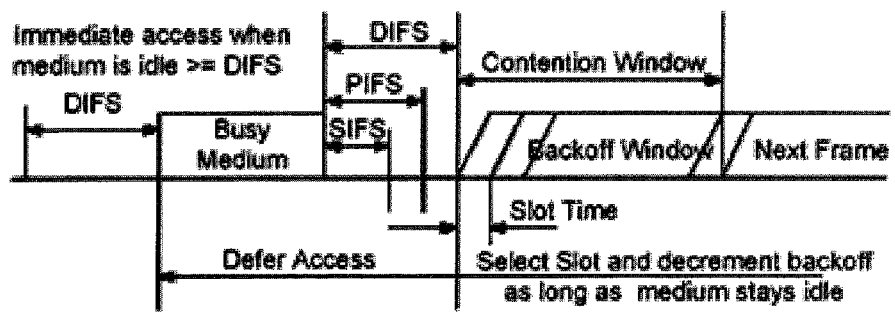
FIG. 2 is an exemplary timing diagram illustrating the difference between interframe spaces.

The present invention contemplates a method for managing prioritized channel access. Prioritized channel access is required for parameterised and prioritized stations. "Parameterised stations" are QoS stations with flows that require guaranteed bandwidth and bounded delays. It is assumed that such stations will use a signaling protocol, for example RSVP with SBM, to request a constant service rate. Prioritized stations are QoS stations that transmit frames with a priority higher than "best effort", without using a signaling protocol to set delay and bandwidth parameters.

The method contemplates utilizing an AP channel access arbitrator that monitors the service rate for "parameterised QoS stations" and initiates unscheduled Point-controlled Contention-free Burst ("P-CFB) polling, as required, during the contention period, to sustain a constant service rate for such stations.

WSTAs may optionally use a signaling protocol to establish service rate parameters. The access arbitrator can use channel load feedback function to estimate channel load and contention. It should be noted that the baseline proposal requires an equivalent function in the AP to set CWmin values per priority.

A P-CFB is essentially a contention-free burst that is extended to include PCF-like polling facilities. For outbound transmissions, the channel access arbitrator gains control of the channel and begins transmitting contention free bursts for the outbound transmissions. For inbound transmissions, the channel access arbitrator gains control of the channel, polls the wireless station, and the wireless station's response is a contention free burst. Therefore, P-CFB can consist of one or more outbound transmissions, one or more polled inbound transmission, or any combination of inbound and outbound transmissions, separated by a SIFS time. A P-CFB is not associated with a DTIM beacon transmission and stations do not preset their NAV for the maximum duration of a P-CFB.

In the PCCA model, WSTAs must support P-CFB polling and a functional interface that enables a signaling protocol to communicate service rate requirements to a bandwidth manager in the AP. It is intended that parameterised services can be implemented by transparently layering a signaling protocol on top of the 802.11E protocol stack in a WSTA. The use of a signaling protocol is optional. Such a requirement is consistent with the baseline proposal, which requires all WSTAs to support CF polling. It is necessary because PCCA polling must be driven by the WSTA application transmission (i.e. sampling) rate to avoid arbitrarily polling WSTAs. The PCF polling rate is driven by the DTIM beacon rate. It is relatively simple to support polling in WSTAs.

Minimum AP requirements are as defined in the baseline proposal. An EAP need only support the level 1 V-DCF QoS protocol. An AP can optionally implement P-CFBs, CFPs, an overlap mitigation protocol, support for a QoS signaling protocol, and level 3 polling and TXOP enhancements. An AP must implement a signaling protocol and P-CFB polling to support a constant service rate for each parameterised station.

CSMA channel efficiency can be very high, even under heavy load, if the contention population is small. The PCCA model attempts to divide the entire station population into a small EAP population and a non-EAP station population, for channel access purposes, so that an EAP can deterministically gain access to the channel, in the contention period, to transmit outbound frames or initiate a P-CFB. The EAP maintains control of the channel during a P-CFB with the DCF CCA and DCF channel reservation mechanisms.

In one embodiment of this invention, the tiered channel access method, combined with some form of priority queuing, is all that is necessary to assure timely delivery of outbound high-priority unicast or multicast frames. CFPs can optionally be used to reduce contention, from hidden nodes, for outbound multicast transmissions associated with DTIM beacons.

For inbound unicast transmissions, a channel access arbitrator in the EAP monitors the service rate for stations and initiates polling, as required, to maintain a constant service rate for parameterised stations. Note that all inbound transmissions, in a BSS, are unicast. In a simple implementation, the access arbitrator can maintain a "poll timer" for each parameterised station. A station is polled if the poll timer expires and the poll timer is reset each time the EAP receives an inbound frame from the station. The duration of the poll timer can be set long enough so that polling is never used on lightly, or moderately loaded channels and short enough so that the minimum delay for the respective flow is not exceeded. Note that a station can be polled in either the optional contention-free period or the contention period.

An interactive voice session typically comprises of 2 fixed-rate intermittent flows. A flow periodically goes idle due to "silence suppression". For such applications, the channel access arbitrator can use a channel load feedback function to monitor the channel load. The arbitrator initiates P-CFB polling for such stations if 1) the poll timer has expired, and 2) the channel load is greater than the channel load threshold associated with the flow. On moderately loaded channels, the point controller will not waste bandwidth polling for inactive flows.

Streaming video applications typically generate a constant stream of variable-sized compressed frames. Note that a single arbitration algorithm can support both VoIP and streaming video, simply by setting the channel load threshold, for streaming video flows, to a low value (i.e. 0), to trigger P-CFB polling whenever the poll timer expires.

The use of the optional multi-poll mechanism, is not prohibited during a P-CFB. However, simple, explicit polling works better with variable rate flows, for example streaming video, and explicit polling can help prevent interference from hidden nodes.

The point controller does not necessarily know the duration of an inbound transmission associated with a P-CFB poll. Therefore, the DCF channel reservation (i.e. in the Duration/ID field) in a P-CFB poll must be for a time slightly longer than the worst-case maximum fragment transmission time. A WSTA should adjust point controller channel reservations, as is appropriate. For example, a WSTA should cancel a point controller reservation, if it receives a unicast frame from the point controller, where the RA address matches the WSTA address. A WSTA should shorten its reservation if receives a frame from the point controller, where the reservation is shorter, and the RA address does not match.

Simple P-CFB polling sequences, that consist of 1) an AP poll, 2) a W-STA data frame, and 3) and an AP ACK, work well in environments with hidden nodes. The reservation in the initial AP poll frame reserves the channel, in the coverage area of the AP, for the duration of the, possibly hidden, data transmission from the WSTA. The final AP ACK transmission cancels the reservation (i.e. which may exceed the duration of the, possibly null, data transmission).

The hidden node problem is exacerbated by WSTAs that change frequencies or wake up, sense the channel idle for a DIFS time, and transmit. Such WSTAs may miss an initial poll or CTS frame that preceded a transmission from a hidden WSTA. The hidden node problem can be partially addressed by limiting the maximum duration of inbound transmissions so that unicast transmission sequences consist of alternating AP transmissions and bounded WSTA transmissions. Interleaved AP polls, for example, can be used to sustain the channel reservation at the AP during P-CFB polling in the contention period. WSTAs are initially required to sense the channel for a time slightly greater than the maximum transmission duration of an inbound fragment, where a fragment can be a partial frame or a whole frame, after first waking up or changing frequencies. U.S. Pat. No. 5,673,031, hereby incorporated by reference, describes such a protocol. Note that the channel reservation at the AP cannot be sustained for unbounded back-to-back TXOPs, with either delayed ACKs or no ACKs.

A WSTA "queue feedback mechanism" enables the point controller to determine the priority queue state in QoS stations, so that the point controller could use priority scheduling for inbound transmissions. Such a feedback mechanism would be useful for ordering polls and avoiding unnecessary polls. For example, the channel access arbitrator could reset its poll timer for a station if an ACK from the station indicated that it did not have data queued.

It might also be useful to include a "priority token" on outbound unicast data frames. For example, a QoS station could respond to an outbound unicast transmission, where the RA address matched the station address, with an inbound transmission, with a piggybacked ACK, if it had an equal or higher priority data frame queued. Such a mechanism would be useful for maintaining a constant service rate, without explicit polling, for applications with constant bi-directional flows (i.e. interactive voice without silence suppression).

The following channel access rules are used to implement the tiered channel access method for the contention period for the prevent invention. An EAP can use the tiered access method to gain control of the channel for the transmission of any outbound frame (i.e. beacon, data, and management frames) or to initiate a P-CFB. Note that a contention-free burst, as defined in the baseline proposal, can be regarded as a special case of a P-CFB. First, an EAP can access the channel during the contention period (CP) after the channel is idle for a SIFS time following an inbound or WSTA-to-WSTA transmission sequence initiated by a WSTA within the BSS controlled by the EAP. Second, CWmin values can be set differently for EAPs and WSTAs to prioritise EAP channel access, as defined in the baseline proposal. Third, an EAP must only sense the channel idle for a PIFS time before initiating the post-backoff following a successful or unsuccessful single-frame or burst transmission. QoS WSTAs and legacy WSTAs must sense the channel idle for a DIFS time. Fourth, an EAP must only sense the channel idle for a PIFS time before restarting its backoff countdown, following a busy channel sense. Fifth, the configuration variable that controls the maximum duration of a P-CFB is the same as the variable that controls the maximum duration of an AP contention-free burst, as defined in the baseline proposal. Sixth, the DCF access mechanisms (channel reservation and CCA) are used to control the channel during a P-CFB. Bit 15 is set to 0 in the Duration/ID field, in a frame transmitted during a P-CFB, to indicate that the field contains a valid channel reservation value.

It has been noted that 802.11 CSMA "slot" times can be ambiguous. In the contention period, stations that are waiting to access a busy channel must sense the channel idle for a fixed time before restarting the backoff countdown. In the integrated mode, the idle sense time is a PIFS time for EAPs and a DIFS time for other WSTAs. The end of a transmission provides a "slot synchronization point" for stations waiting to access the channel. The efficiency of a CSMA algorithm can be greatly increased if stations transmit on slot boundaries (i.e. following the end of a transmission). However, the present invention is not limited to this method.

Another aspect of the present invention is power management. The PCCA model adheres to the channel access rules defined in the 802.11 standard and the baseline proposal. The baseline proposal removes the restriction that buffered multicast/broadcast frames must be sent immediately following a DTIM beacon. If "strict ordering" is not enabled, then the current 802.11 standard specifies that an AP must buffer all outbound multicast frames and deliver them immediately following a DTIM beacon. Therefore, short DTIM intervals are necessary to support multicast applications that cannot tolerate delays.

The baseline proposal requires that QoS WSTAs must be CF-Pollable. Therefore, QoS power-save WSTAs do not use the PS-Poll mechanism for the delivery of outbound buffered messages. Instead, a QoS PS WSTA must adhere to the existing standard for CF-Pollable stations. That is, it must stay awake, after it receives a DTIM beacon with its AID bit set on, until either it receives a unicast frame with the more bit set off, or a TIM with its AID bit set off.

It is generally assumed, but not required, that QoS WSTAs with active flows will operate in active mode, because a point controller cannot successfully poll a WSTA that is in power-save mode. The baseline proposal defines "awake-time epochs" that can, optionally, be used to set an awake-time window for periodic polling and/or outbound data transmissions.

However, awake-time epochs introduce complexity for P-CFB polling and PCF polling. If power management must be supported, it would be simpler to schedule P-CFB polls for power-save parameterised WSTAs, if such WSTAs used automatic power-save intervals, where power-save intervals are defined as follows: Such a power-save WSTA can remain in power-save mode for, at most, the duration of its "automatic power-save interval", following an inbound transmission, where the duration is selected to match the WSTAs inbound transmission rate. The WSTA must operate in active mode, after a power-save interval expires, until the end of the next polling sequence or inbound transmission. The point controller can simply adjust the duration of the poll timer, for a WSTA, so that it is greater than the sleep-time window duration. The point controller can then poll a WSTA and/or deliver outbound buffered data for a WSTA when the poll timer expires.

If "strict ordering" is not enabled, then the current 802.11 standard specifies that an AP must buffer all outbound multicast frames and deliver them immediately following a DTIM beacon. Therefore, short DTIM intervals are necessary to support multicast applications that cannot tolerate delays.

A layer 2 multicast group is typically associated with a single higher layer application such as example streaming video. The present invention supports "power-save" and "active" multicast addresses, where a multicast address is classified as "power-save" if any station in the multicast group is in power-save mode. Then outbound frames destined to an "active" multicast RA address can be delivered immediately. Therefore, the DTIM interval can, potentially, be much longer. Note that a multicast registration protocol (i.e. GMRP) is required to associate multicast addresses with stations.

It should be noted that outbound multicast transmissions are more susceptible to problems associated with inter-BSS contention and hidden nodes because multicast frames are not retransmitted, for example after a collision with a hidden node, and the DCF channel reservation mechanisms cannot be used for multicast frames. In the method of the present invention, CFPs are primarily used to increase the reliability for multicast transmissions. A CFP scheduling algorithm can be used to prevent CFPs in adjacent BSSes from colliding.

In a single-BSS environment, the tiered access method enables an EAP to quickly access the channel in the contention period, with a worst-case latency equal to the maximum duration of a 2304-byte transmission sequence. Note that the tiered channel access method allows the EAP to use CWmin values of 0 in the absence of channel contention from other APs. The EAP uses the DCF CCA and DCF channel reservation mechanisms to maintain control of the channel during a P-CFB. SIFS frame spacing is used for both P-CFBs and WSTA CFBs. The maximum duration of a P-CFB can be increased to improve channel efficiency. Therefore, the method of the present invention is comparable to a PCF-based solution with respect to determinism and channel efficiency.

Networks with multiple and overlapping BSSes may have problems with hidden CFP's or hidden nodes. A "hidden CFP" is a CFP in a first BSS where the point controller is not within the range of a station in a second neighboring BSS. Likewise, a "hidden node" is a station in a first BSS that is not within the range of the point controller for a CFP in a second neighboring BSS.

In environments with multiple, overlapping BSSes, the present invention reduces inter-BSS contention and increases spatial reuse because it relies on short randomly-spaced DCF-based P-CFBs, with short localized reservations, rather than long scheduled PCF-based CFPs. The CFP rate can be decreased, and the inter-DTIM period can be increased because the CFP rate is independent of the application sampling rates.

In networks with overlapping BSSes in the same ESS or multiple ESSes, a CFP for a BSS is not completely contention-free unless all stations, in any neighboring BSS, that are in-range of any active stations in the BSS, set their NAV for CFPMaxDuration for the CFP. Therefore, the total "reservation area" for a CFP can be very large compared to the coverage area of the point controller for the BSS. In contrast, the reservation area for a P-CFB unicast transmission sequence is limited to the coverage area of the respective stations and the reservation is cancelled when the transmission sequence ends.

Figure 3:
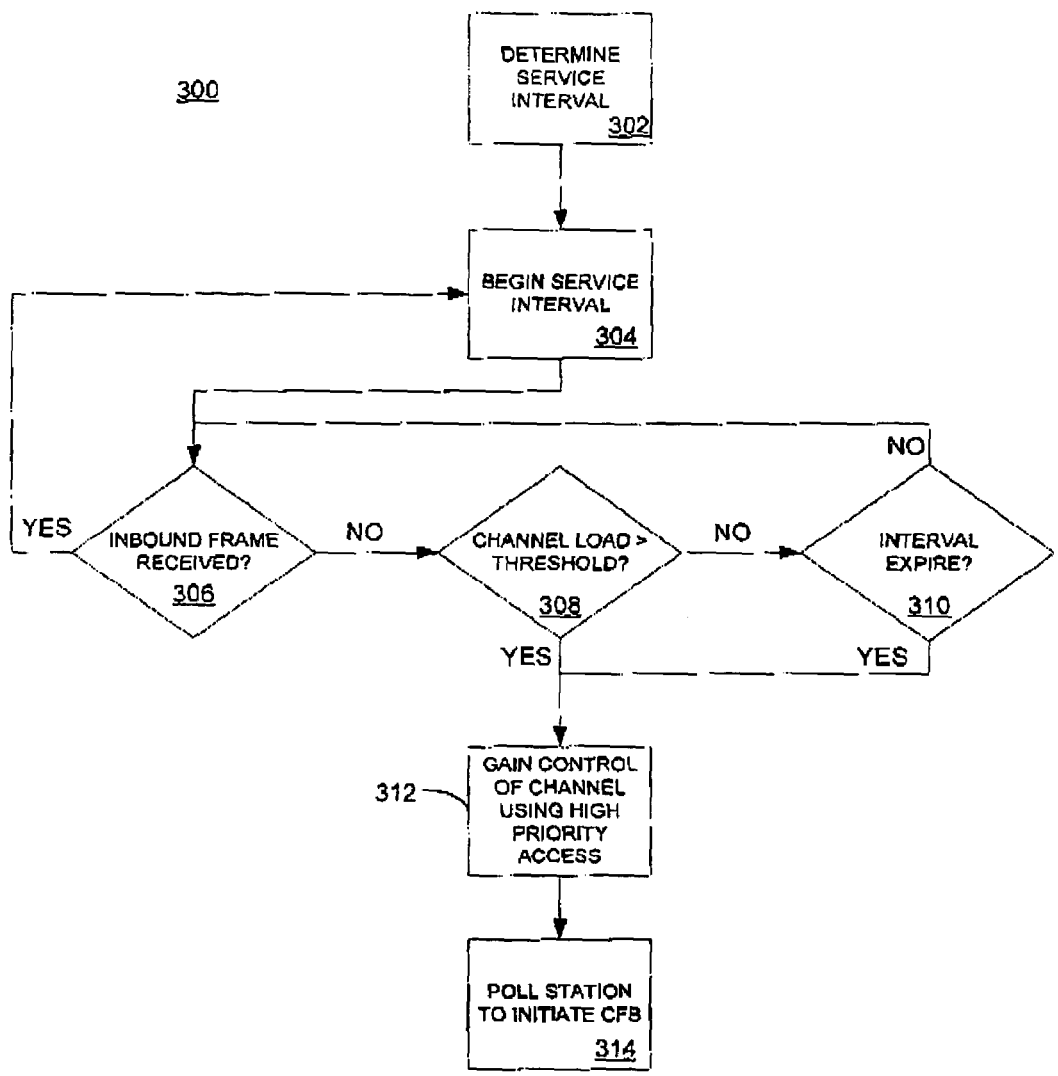
FIG. 3 is a flow diagram illustrating a methodology in accordance with an aspect of the present invention.

Referring now to FIG. 3, there is illustrated a methodology 300 in accordance with an aspect of the present invention. As described hereinbefore the point coordinator (e.g. AP) determines a time interval for which a station must be serviced, which is shown at 302. As stated hereinbefore, the point coordinator starts a poll timer (begin service interval as shown at 304). At 306, if an inbound frame is received (YES), the service interval re-starts. Otherwise (NO), at 308, a determination is made whether the channel load exceeds a predetermined threshold. At 310 a determination is made whether the interval expired. If either the channel load exceeds the predetermined threshold at 308 (YES) or the interval expires at 310 (YES), then at 312 the point coordinator gains control of the channel using high priority access. As stated hereinbefore, the point coordinator can gain control of the channel by waiting an SIFS time period following an inbound frame or a WSTA to WSTA transmission sequence initiated by a WSTA within the BSS. After a successful or unsuccessful single frame or bust transmission sent by the point coordinator, or after a busy channel sense, the point coordinator waits for the channel to be idle a PIFS time before gaining control of the channel

The invention claimed is:

1. A method for providing quality of service during a contention period, comprising:
    determining whether a channel load exceeds a predetermined level;
    reserving the channel using high priority access responsive to determining the channel exceeds the predetermined level;
    polling to initiate a point controlled contention free burst responsive to determining the channel exceeds the predetermined level during the contention period;
    receiving the contention free burst during the contention period responsive to the poll; and
    sending an acknowledgement to the contention free burst;
    wherein sending the acknowledgement to the contention free burst cancels the channel reservation.

2. The method for providing quality of service during a contention period as in claim 1, the reserving a channel further comprising sensing the channel for a sensing time period.

3. The method for providing quality of service during a contention period as in claim 2, the reserving a channel further comprising sensing the that the channel is idle for one of the group consisting of a point coordination interframe space and a short interframe space.

4. The method providing quality of service during a contention period as in claim 3, wherein the sensing time period is a short interframe space after receiving an inbound transmission.

5. The method for providing quality of service during a contention period as in claim 4, wherein the sensing time period is a short interframe space after a station to station transmission that originates within a basic service set.

6. The method for providing quality of service during a contention period as in claim 1, further comprising:
    determining a predetermined interval corresponding to a service rate for an associated wireless client; and
    waiting for the predetermined interval to expire;
    wherein polling to initiate a point controlled contention free burst is responsive to the predetermined interval expiring.

7. The method for providing quality of service during a contention period as in claim 6, further comprising:
    receiving an inbound frame from the associated wireless client; and
    re-starting waiting for the predetermined interval to expire responsive to receiving the inbound frame.

8. The apparatus as in claim 1, wherein the access point reserves the channel by sensing the channel for a predetermined time period.

9. The apparatus as in claim 8, wherein the access point senses the channel is idle for one of the group consisting of a point coordination interframe space and a short interframe space.

10. The apparatus as in claim 8, wherein the predetermined time period is a short interframe space after receiving an inbound transmission.

11. An apparatus, comprising
    an access point for providing quality of service during a contention period;
    wherein the access point is configured to determine whether a channel load exceeds a predetermined level;
    wherein the access point is configured to reserve the channel using high priority access responsive to determining the channel exceeds the predetermined level;
    wherein the access point is configured to implement polling to initiate a point controlled contention free burst responsive to determining the channel exceeds the predetermined level during the contention period;
    wherein the access point is configured to receive the contention free burst during the contention period responsive to the poll;
    wherein the access point is responsive to send an acknowledgement to the contention free burst; and
    wherein sending the acknowledgement to the contention free burst cancels the channel reservation.

12. The apparatus as in claim 11, further comprising:

the access point is configured to wait for the predetermined interval corresponding to a service rate for an associated wireless client; and the access point is wait for the predetermined interval to expire;

wherein polling to initiate a point controlled contention free burst is responsive to the predetermined interval expiring.

13. The apparatus as in claim 11, further comprising:

the access point is responsive to receiving an inbound frame from the associated wireless client to re-start waiting for the predetermined interval to expire responsive to receiving the inbound frame.

14. An apparatus for providing quality of service during a contention period, comprising:

means for determining whether a channel load exceeds a predetermined level;

means for reserving the channel using high priority access responsive to determining the channel exceeds the predetermined level;

means for polling to initiate a point controlled contention free burst responsive to the determining the channel exceeds the predetermined level during the contention period;

means for receiving the contention free burst during the contention period responsive to the poll; and means for sending an acknowledgement to the contention free burst;

wherein sending the acknowledgement to the contention free burst cancels the channel reservation.

15. The apparatus as in claim 14, further comprising:

means for determining a predetermined interval corresponding to a service rate for an associated wireless client; and means for waiting for the predetermined interval to expire;

wherein the means for polling to initiate a point controlled contention free burst is responsive to the predetermined interval expiring.

16. The apparatus as in claim 14, further comprising:

means for receiving an inbound frame from the associated wireless client; and means for re-initializing the means for waiting for the predetermined interval to expire responsive to the means for receiving the inbound frame.

* * * * *